Sept. 9, 1924.  
F. L. BARROWS  
ATTACHMENT FOR OPTICAL INSTRUMENTS  
Filed June 17, 1920

1,508,043

WITNESSES  
R. E. Rousseau  
W. F. Buckley

INVENTOR  
Frank L. Barrows  
BY  
Munn & Co.  
ATTORNEYS

Patented Sept. 9, 1924.

1,508,043

UNITED STATES PATENT OFFICE.

FRANK LEE BARROWS, OF MOSCOW, IDAHO.

ATTACHMENT FOR OPTICAL INSTRUMENTS.

Application filed June 17, 1920. Serial No. 389,658.

*To all whom it may concern:*

Be it known that I, FRANK L. BARROWS, a citizen of the United States, and a resident of Moscow, in the county of Latah and State of Idaho, have invented certain new and useful Improvements in Attachments for Optical Instruments, of which the following is a specification.

My invention relates generally to attachments for optical instruments, and more particularly to an auxiliary lens attachment for microscopes, telescopes, field-glasses, engineer's transit or the like.

Heretofore the use of optical instruments such as the microscope has involved a considerable eye strain to a person who has a refractive error unless glasses to correct the error are worn. When however glasses are used for this purpose the lens of the glasses holds the pupil of the eye so far away from the lens of the objective that it is difficult to get the pupil in the exact focus of the objective. This of course results in the blurring of the image with consequence eye strain, and with the more serious difficulty that a clear view of the slide and the objects being examined cannot be obtained. Again the contact or rubbing of the lenses of the glasses against the lens of the objective results in the scratching of the surface of both lenses with consequent injury to the optical properties of each. Finally there is a constant tendency under these circumstances for the lenses of the glasses to collect moisture by reason of the condensation of the perspiration so that it is necessary to interrupt the microscopic operation to remove the glasses and wipe them clear.

One of the principal objects of the present invention is to overcome these difficulties by associating or embodying in the structure of the microscope an auxiliary lens which operates to correct the refractive error of the person using the microscope, the auxiliary lens being preferably associated with the structure of the microscope after the manner of an attachment so that it may be readily applied and removed and will not impair the utilities of the microscope under any circumstances or limit its use to any particular individual or individuals.

Other objects and advantages of the invention reside in certain novel features of construction, combination and arrangement of parts which will be hereinafter more fully described and particularly pointed out in the appended claims, reference being had to the accompanying drawings, in which:

Figure 1:
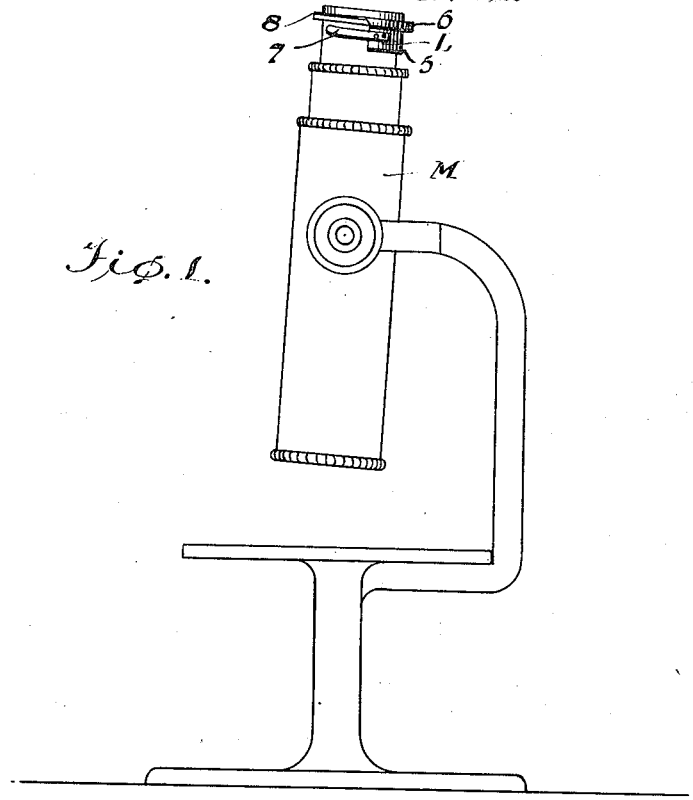
Figure 1 is an elevational view, showing an embodiment of my invention applied to a microscope.
Figures 2, 3:
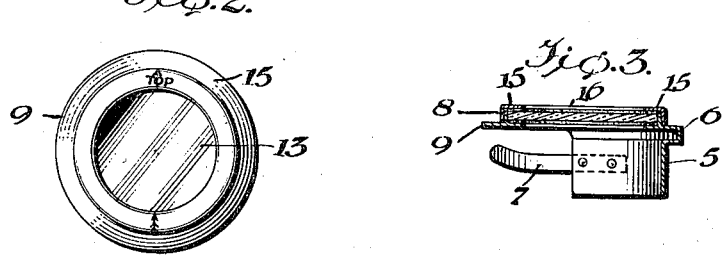
Figure 2 is a plan view.
Figure 3 is a transverse vertical section of the attachment.
Figure 4:
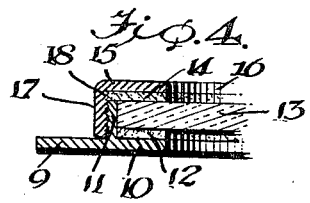
Figure 4 is a detail sectional view of the auxiliary mounting in the attachment.

Referring to the drawings it will be seen I have shown the preferred embodiment of the invention as applied to a microscope, which may be of any conventional construction and which is indicated at M.

The auxiliary lense attachment, indicated at L, is adapted to be associated with the structure of the microscope preferably adjacent the eye piece thereof and comprises for this service a semi-circular sleeve 5 having an internal semi-annular recess 6 at its upper end whereby the sleeve may conform to the contour of the eye-piece. The end of the sleeve carries spring clips 7 which extend around and grip the eye-piece as shown in the drawings.

The auxiliary lens mount, indicated generally at 8, consists of an annular disk 9 preferably intergral with the sleeve 5, the sleeve 5 being formed to depend from the annular disk 9. An upstanding annular flange 12 is integrally formed with the annular disk 9 and has its outer periphery threaded, as indicated at 11. A ring 12 of felt is arranged to rest upon the upper face of the disk 9 intermediate its central opening and the flange 11. The auxiliary lens 13 which is ground to the personal correction of the individual using the microscope, is arranged to lie upon the ring or felt 12 and is prevented from lateral displacement by the flange 11. An upper ring of felt 14 which is slightly larger than the lower ring 12 is disposed upon the marginal edge of the auxiliary lens and the upper surface of the top or flange 11. A cap 15 having a central aperture 16 and having its depending flange 17 internally threaded, as at 18, is screwed upon the upstanding flange 11. The under surface of the cap engages the upper ring of felt 14 thus retaining the rings of felt and the auxiliary lens in position.

In practice, the auxiliary lens may be easily applied and removed, it being only necessary to apply it to spread the spring clips and slide the lens mount on the eye-piece so that the recess 6 engages over the rim of the eye-piece and the sleeve 5 snugly embraces the outer wall thereof. The clips 7 then snap into position to retain the auxiliary lens in position. The microscope may then be used with efficiency and comfort, the auxiliary lens taking care of the refractive error of the individual.

I claim:

1. In a device of the character described, in combination with an optical instrument, an auxiliary lens correcting the refractive error of the person using the instrument, and a mount for said lens including an annular disk having an annular upstanding flange, a lower ring of felt carried on the disk and engaging the lower marginal edge of the auxiliary lens, an upper ring of felt engaging the upper edge of the auxiliary lens and carried thereby and a cap having a threaded engagement with the upstanding flange and compressing the upper ring of felt to retain the auxiliary lens in position.

2. An attachment for use with optical instruments comprising an auxiliary lens for correcting the refractive error of a person using the instrument, and means for attaching the auxiliary lens including a semi-circular sleeve adapted to surround a portion of the instrument and spring clips carried by the sleeve and gripping the instrument.

3. An attachment of the character described for use with microscopes comprising an auxiliary lens correcting the refractive error of a person using the instrument, a mount for said lens consisting of an annular disk having an annular upstanding flange, a lower ring of felt carried on the disk and engaging the lower marginal edge of the auxiliary lens, an upper ring of felt engaging the upper edge of the auxiliary lens, and a cap having a threaded engagement with the upstanding flange and compressing the upper ring of felt to thereby retain the auxiliary lens in position, and attaching means including a semi-circular sleeve depending from the disk and having a semi-annular flange fitting over the rim of the eye-piece and a pair of spring clips carried by the sleeve and extending around and gripping the eye-piece.

FRANK LEE BARROWS.